US011463757B2

(12) United States Patent
Shen et al.

(10) Patent No.: US 11,463,757 B2
(45) Date of Patent: Oct. 4, 2022

(54) MEDIA STREAMING FOR RECEIVER-ENABLED RESOLUTION

(71) Applicant: Intel Corporation, Santa Clara, CA (US)

(72) Inventors: Gang Shen, Hillsboro, OR (US); Jun Tian, Portland, OR (US)

(73) Assignee: Intel Corporation, Santa Clara, CA (US)

(*) Notice: Subject to any disclaimer, the term of this patent is extended or adjusted under 35 U.S.C. 154(b) by 626 days.

(21) Appl. No.: 16/144,755

(22) Filed: Sep. 27, 2018

(65) Prior Publication Data
US 2019/0045251 A1    Feb. 7, 2019

(51) Int. Cl.
| | |
|---|---|
| G06F 15/16 | (2006.01) |
| H04N 21/2662 | (2011.01) |
| H04N 21/2343 | (2011.01) |
| H04L 65/1066 | (2022.01) |
| H04N 21/643 | (2011.01) |
| H04L 65/403 | (2022.01) |

(Continued)

(52) U.S. Cl.
CPC ..... *H04N 21/2662* (2013.01); *H04L 65/1066* (2013.01); *H04L 65/403* (2013.01); *H04L 65/65* (2022.05); *H04L 65/765* (2022.05); *H04L 65/80* (2013.01); *H04N 21/234327* (2013.01); *H04N 21/234363* (2013.01); *H04N 21/234381* (2013.01); *H04N 21/2402* (2013.01); *H04N 21/440263* (2013.01); *H04N 21/64322* (2013.01); *H04N 21/658* (2013.01)

(58) Field of Classification Search
CPC ....... H04N 21/2662; H04N 21/234363; H04N 21/234381; H04L 65/1066; H04L 65/608

USPC ........................................................ 709/231
See application file for complete search history.

(56) References Cited

U.S. PATENT DOCUMENTS

| | | | |
|---|---|---|---|
| 2013/0201316 A1* | 8/2013 | Binder | H04L 67/12 701/2 |
| 2016/0134673 A1* | 5/2016 | MacInnis | H04L 65/602 709/231 |

(Continued)

OTHER PUBLICATIONS

Gilman, R. et al., "Session Description Protocol (SDP) Media Capabilities Negotiation", RFC6871, Feb. 2013, 55 pages.

(Continued)

*Primary Examiner* — Suraj M Joshi
*Assistant Examiner* — Joel Mesa
(74) *Attorney, Agent, or Firm* — Compass IP Law PC (57) ABSTRACT

A sender transmits media streams at receiver-enabled resolutions. The sender, a media server that has multiple resolutions of media available to stream, is made aware of the capability of the receiver to process lower resolution media streams, including a super-resolution capability to enhance the lower resolution media stream using temporal and/or spatial information contained in the lower resolution media stream. The media server sends lower resolution streams to the receiver, thereby freeing up bandwidth on the communication channel for other uses. The receiver can notify the sender of events that affect the status of the super-resolution capability on the receiver, and the sender can adjust the resolution and bitrate of the media stream accordingly to optimize use of the communication channels and resources by encoding and transmitting high resolution video frames only when needed.

15 Claims, 6 Drawing Sheets

(51) Int. Cl.
  *H04N 21/24*     (2011.01)
  *H04N 21/4402*   (2011.01)
  *H04N 21/658*    (2011.01)
  *H04L 65/80*     (2022.01)
  *H04L 65/65*     (2022.01)
  *H04L 65/75*     (2022.01)

(56) References Cited

U.S. PATENT DOCUMENTS

2018/0014082 A1* 1/2018 Daily .............. H04N 21/23439
2018/0242017 A1* 8/2018 Van Leuven .......... H04N 19/40

OTHER PUBLICATIONS

Huitema, C., "Real Time Control Protocol (RTCP Attribute In Session Description Protocol (SDP)", RFC3605, Oct. 2003, 8 pages.
Ott, J. et al., "Extended RTP Profile For Real-time Transport Control Protocol (RTCP)-Based Feedback, (RTP/AVPF)", RFC4585, Jul. 2006, 51 pages.

* cited by examiner

402 – SR OFF (SRX0) RTCP PACKET

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| subtype  |   PT=APP=204  |             length            |
+-+-+-+-+-+-+-+-+-+-+-+-+-+-+-+-+-+-+-+-+-+-+-+-+-+-+-+-+-+-+-+-+
|                          SSRC/CSRC                             |
+-+-+-+-+-+-+-+-+-+-+-+-+-+-+-+-+-+-+-+-+-+-+-+-+-+-+-+-+-+-+-+-+
|                       SRX0 (name in ASCII)                     |
+-+-+-+-+-+-+-+-+-+-+-+-+-+-+-+-+-+-+-+-+-+-+-+-+-+-+-+-+-+-+-+-+
|                         NTP Timestamp                      ... |
+-+-+-+-+-+-+-+-+-+-+-+-+-+-+-+-+-+-+-+-+-+-+-+-+-+-+-+-+-+-+-+-+
```

Fig.4A

402 – SR ON (SRX1) RTCP PACKET

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| subtype  |   PT=APP=204  |             length            |
+-+-+-+-+-+-+-+-+-+-+-+-+-+-+-+-+-+-+-+-+-+-+-+-+-+-+-+-+-+-+-+-+
|                          SSRC/CSRC                             |
+-+-+-+-+-+-+-+-+-+-+-+-+-+-+-+-+-+-+-+-+-+-+-+-+-+-+-+-+-+-+-+-+
|                       SRX1 (name in ASCII)                     |
+-+-+-+-+-+-+-+-+-+-+-+-+-+-+-+-+-+-+-+-+-+-+-+-+-+-+-+-+-+-+-+-+
|                         NTP Timestamp                      ... |
+-+-+-+-+-+-+-+-+-+-+-+-+-+-+-+-+-+-+-+-+-+-+-+-+-+-+-+-+-+-+-+-+
```

MEDIA STREAMING FOR RECEIVER-ENABLED RESOLUTION

TECHNICAL FIELD

The technical field relates generally to streaming media over a network and, in particular, to controlling the resolution of streaming media.

BACKGROUND ART

Streaming media over internet and intranet networks is increasing dramatically. Among other examples, video conferencing and web-based social chats are increasingly popular applications. Users demand video transmitted at higher resolutions with lower latency. The resulting increase in bandwidth and computing costs to transmit and encode media streams places a large burden not only on servers but also on each client device.

In response to the increased demands, various technologies for video codecs and network protocols, such as SVC (Scalable Video Coding), RTP (Real-time Transmission Protocol), simulcast, etc. have been designed to push the video content as fast and as accurately as possible in real-time communication.

In addition to video codecs and network protocols an emerging technology to meet the demand for streaming high quality video is video super resolution, a machine learning based technology that uses temporal and spatial information to up-sample video frames in real-time and with reasonably good quality. Video super resolution is considered a good addition to current video compression technologies because it allows video to be encoded and transmitted at lower resolution, and therefore with lower bitrate and lower latency.

BRIEF DESCRIPTION OF THE DRAWINGS

The described embodiments are illustrated by way of example and not limitation in the figures of the accompanying drawings, in which like references indicate similar elements and in which.

Other features of the described embodiments will be apparent from the accompanying drawings and from the detailed description that follows.

DESCRIPTION OF THE EMBODIMENTS

Transmitting video content as fast and as accurately as possible includes simultaneous transmission (simulcast) of multiple versions of a video stream using different resolutions, frame rates or bit rates. A media server that supports simulcast is typically capable of receiving a media stream with multiple resolutions (e.g. Scalable Video Coding) or multiple media streams of different resolutions. The media server decides which of these resolutions should be transported to which participants based on network conditions estimated by a network congestion control algorithm. However network congestion protocols act as only a safety measure by preventing real-time communication flows from using excessive resources and protecting the network from overload.

To benefit fully from the emerging technology of video super resolution or other similar technologies, collectively referred to herein as super resolution (SR), a network protocol, such as the real-time communication protocol (RTP/RTCP) is modified to support receiver-enabled resolution capability. In one embodiment, as participants of a real-time communication session, a sender is made aware of the capability of SR on the receiver. The sender, i.e., a media server, can then select a resolution of a media stream based on the receiver's SR capability. For example, in one embodiment, the media server/sender can send a lower resolution stream to client device/receiver capable of enhancing the lower resolution stream using SR, thereby freeing up bandwidth on the communication channel for other uses.

In one embodiment, the receiver further notifies the sender of events that affect the status of SR capability on the receiver, i.e. events that have enabled and disabled SR capability on the receiver. The sender can adjust the resolution and bitrate of the media stream according to the current status of SR capability on the receiver. In this manner, the sender/media server can use the status of SR on a receiver to optimize use of the communication channels and resources by encoding and transmitting high resolution video frames only when needed. By streaming media to one or more receivers based on SR capability and status, the sender/media server can leverage the receivers' computing power to increase throughput and conserve resources.

In one embodiment, the receiver and sender can operate as client-side or server-side systems and vice versa. For ease of illustration the described embodiments refer to scenarios in which a media server transmits media streams in the context of simulcasting, such as might be used in a video conferencing system. However, embodiments of media streaming for receiver-enabled resolution can be implemented in the context of other types of media servers that stream media to receivers that have the capability to process media streams of different resolutions.

Figure 1:
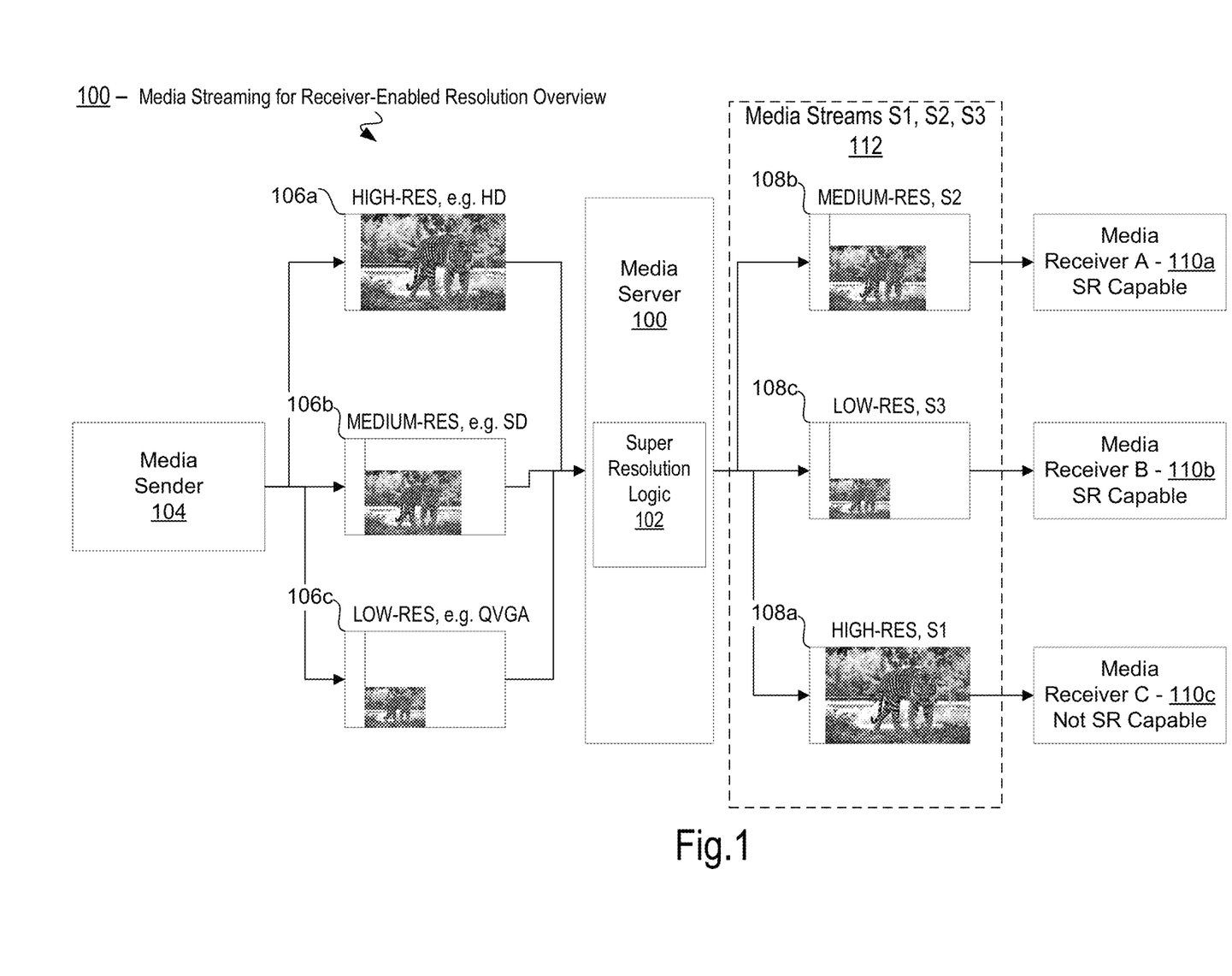
FIG. 1 is a schematic, block diagram illustration of components of apparatus to implement media streaming for receiver-enabled resolution in accordance with various examples described herein.

In FIG. 1, a schematic block diagram illustrates components of a system for implementing media streaming for receiver-enabled resolution in accordance with various examples described herein. Referring to FIG. 1, in one embodiment a media sender 104, such as a participant in a multi-party video conference, in which the maximum size of conferences and the lowest overall cost of infrastructure are of paramount importance, simultaneously transmits multiple versions of the participant's video stream. Each version uses different resolutions, frame rates or bit rates. By way of example only, and not limitation, a high resolution media stream 106a is high definition (HD) video transmitted at 3-7 Mb/sec, a medium resolution media stream 106b is standard definition (SD) video transmitted at 3 Mb/sec, and a low resolution media stream 106c is a QVGA video transmitted at 1.5 Mb/sec. Other types of resolutions can be used when implementing embodiments of media streaming for receiver-enabled resolution.

In one embodiment a media server 100 configured with a super resolution logic 102 receives the multiple versions of a video stream 106a/b/c with different resolutions. The media server 100 uses a communication channel 112 to transmit one or more media streams S1, S2, S3, where S1 108a corresponds to the high resolution media stream 106a, S2 108b corresponds to the medium resolution media stream 106b and S3 108c corresponds to the low-resolution media stream 106c.

By way of example only and not limitation, media receiver A 110a and media receiver B 110b are both SR capable devices as illustrated, but media receiver C 110c is not SR capable. As a result, the media server 100 uses the super resolution logic 102 to selectively stream the high resolution media stream S1 108a to media receiver C 110c since it is not SR capable, and to further selectively stream the medium resolution media stream S2 108b to media receiver A 110a and the low resolution media stream S3 108c to media receiver B 110b, since they are SR capable.

Of course, the described embodiments of media streaming for receiver-enabled resolution can support other combinations of receivers with and without SR capability and other types of media streams having different levels of resolution. In one embodiment, the super resolution logic 102 interfaces with the receivers 110a/110b/110c over communication channel 112 to determine which version of the media stream to transmit to the receivers. In addition, the determination of whether to send the medium or low resolution media stream to the SR capable receivers A and B can be determined, at least in part, by information about current available bandwidth on the communication channel 112 over which the media is streamed.

Figure 2:
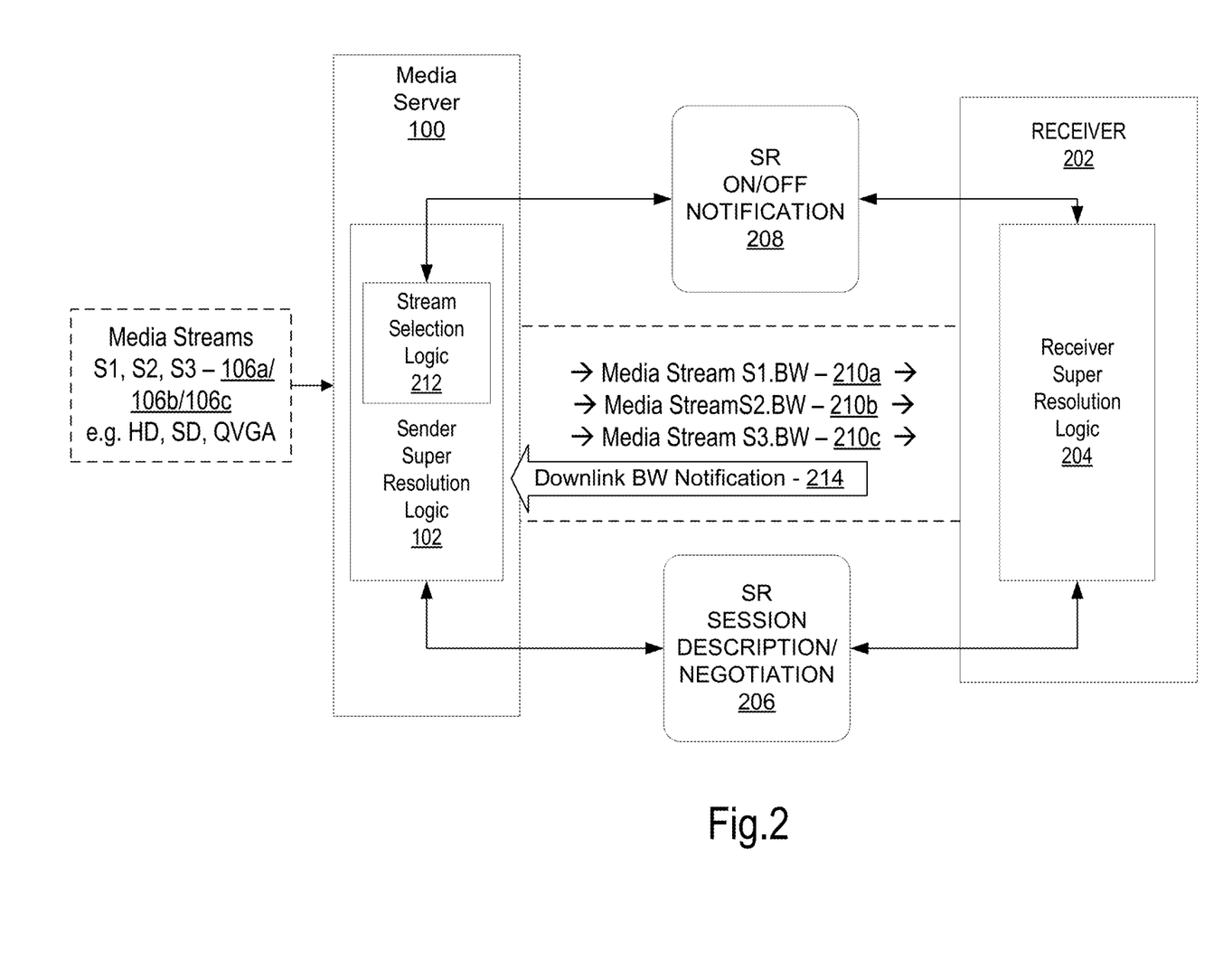
FIG. 2 is a schematic, block diagram illustration of certain aspects of implementing media streaming for receiver-enabled resolution in accordance with various examples described herein.

FIG. 2 illustrates further details of a media server 100 and a receiver 202 and their respective components for selecting which version of the media stream should be transmitted from the media server 100 to the receiver 202. In one embodiment, the receiver 202 includes a receiver super resolution logic 204 that generates and transmits an SR session description negotiation message 206 to the media server 100 to negotiate the terms of a session established between the media server 100 and the receiver 202 for purposes of receiving a media stream. In one embodiment, the receiver super resolution logic generates the message 206 in accordance with the "Session Description Protocol (SDP) Media Capabilities Negotiation" protocol as described in RFC 6871 standard. Further details of the negotiation and message 206 are described with reference to FIG. 3.

With reference to FIG. 2, the sender's super resolution logic 102 in media server 100 completes the session description negotiation with receiver 202. A stream selection logic 212 of the media server 100 receives a downlink bandwidth (BW) notification 214 containing a value X that represents the available bandwidth of the communication channel 112 over which the media streams are transmitted. The stream selection logic 212 also receives update notifications 208 from the receivers with which it has established a session, where the update notifications indicate whether an SR capable receiver 202 as described in the SR session description negotiation 206 is currently SR enabled (SR ON) or SR disabled (SR OFF). The stream selection logic 212 uses the received information regarding available bandwidth 212 and SR ON/OFF notifications 208 to select which media stream to transmit to the receiver 202, e.g., media stream S1.BW 210a, media stream S2.BW 210b, or media stream S3.BW 210c. By way of example only, and not limitation, the media stream S1.BW 210a is the highest resolution stream such as HD, S2.BW 210b is the medium resolution stream such as SD, and S3.BW 210c is the lowest resolution stream such as quarter video graphics array (QVGA).

Figure 3:
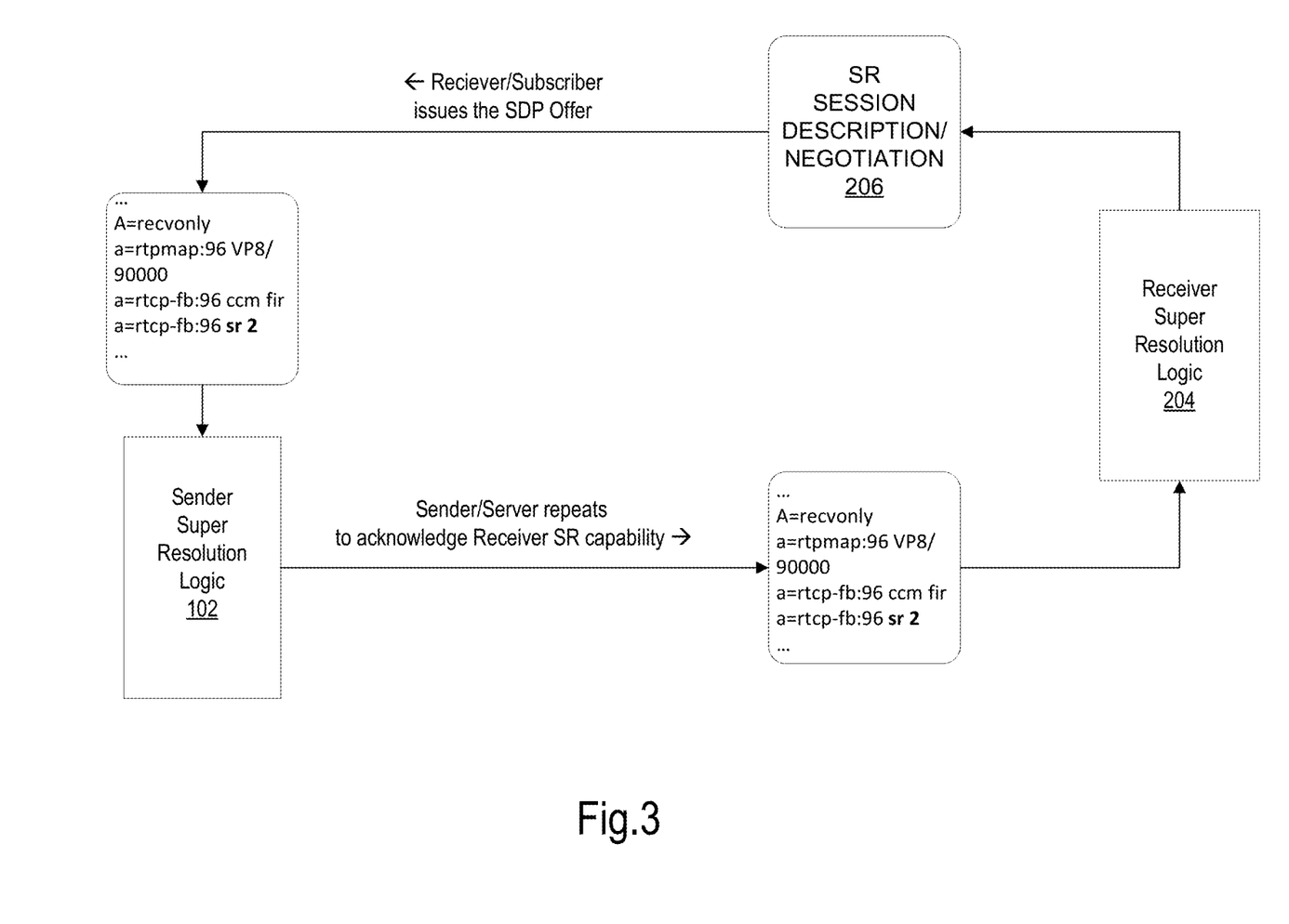
FIG. 3 is a schematic, block diagram illustration of further details of certain aspects of implementing media streaming for receiver-enabled resolution in accordance with various examples described herein.

FIG. 3 illustrates an example SR Session Description Protocol (SDP) negotiation 206 in which the receiver super resolution logic 204 initiates the negotiation on behalf of a receiver/subscriber by issuing an SDP offer message, i.e. the SR negotiation message 206, where the message contains newly defined values for "rtcp-fb-id" and "rtcp-fb-param" as follows:

rtcp-fb-id : "sr"
rtcp-fb-param: a number that indicates the maximum scaling factor In the illustrated embodiment, the newly defined values are generated in accordance with the existing SDP specification based on RFC 3550 as extended in section 4.2 of RFC4585.

For example, rtcp-fb-param value is set to "2" to indicate the maximum scaling factor that the receiver 202 can support when the receiver is capable of SR. In one embodiment, other scaling factors that are compatible with the SR capabilities of the receivers may be employed. In one embodiment, as shown, upon receipt of the SDP offer contained in the SR negotiation message 206, the sender/server repeats the message back to the receiver's super resolution logic 204 to acknowledge and accept the offer of the receiver's 202 SR capability.

Figure 4A:
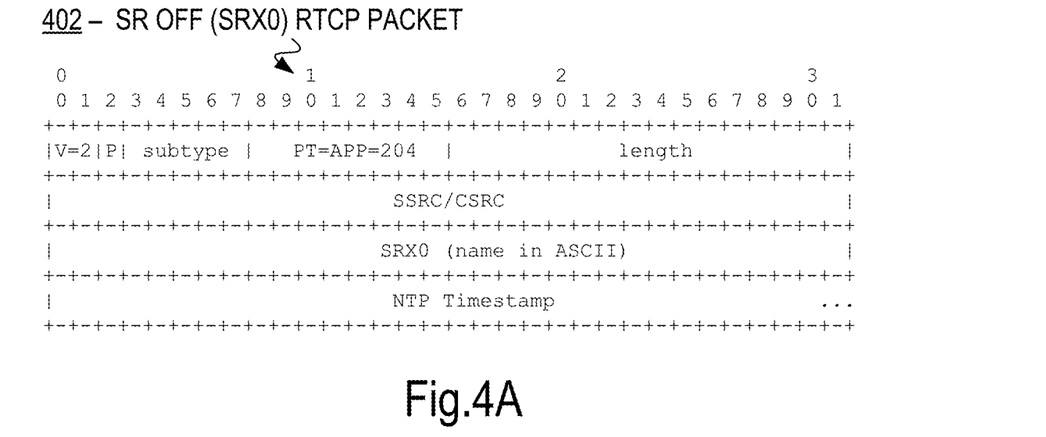
FIGS. 4A-4B are example layouts of a communication packet for implementing media streaming for receiver-enabled resolution in accordance with various examples described herein.
Figure 4B:
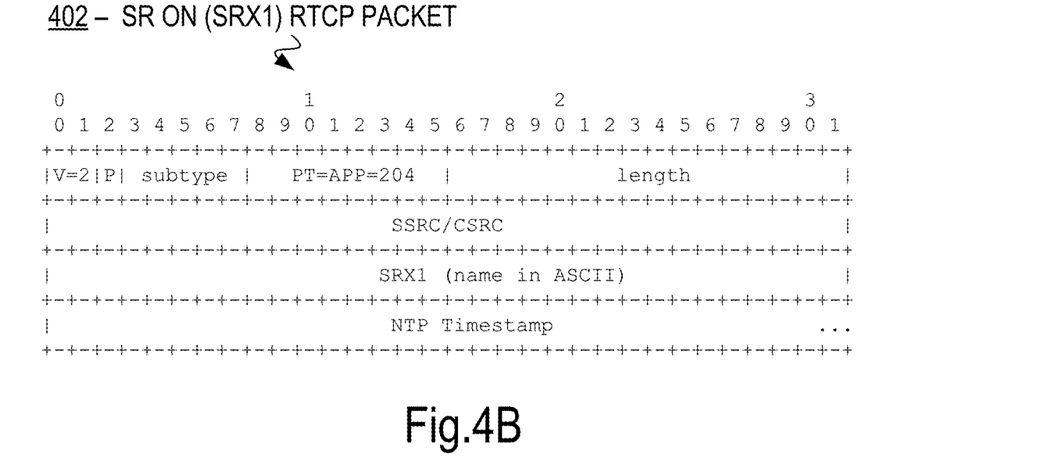

FIGS. 4A-4B illustrate exemplary messages for the receiver 202 to generate to notify the media server/sender 100 about the current status of the receiver's SR capability. For example, with reference to FIG. 4A, to notify the media server/sender 100 that the receiver's SR capability is not currently enabled, the receiver 202 generates the SR OFF (SRX0) packet in accordance with the existing RTCP communications protocol. The media server/sender 100 receives this notification and selects the media stream accordingly as will be described in further detail with reference to FIG. 5.

With reference to FIG. 4B, to notify the media server/sender 100 that the receiver's SR capability is currently enabled, the receiver 202 generates the SR ON (SRX1) packet in accordance with the existing RTCP communications protocol. The media server/sender 100 receives this notification and selects the media stream accordingly as will be described in further detail with reference to FIG. 5. In one embodiment, other types of communication protocols and message packets can be used to notify the media server/sender 100 about the current status of the receiver's SR capability.

Figure 5:
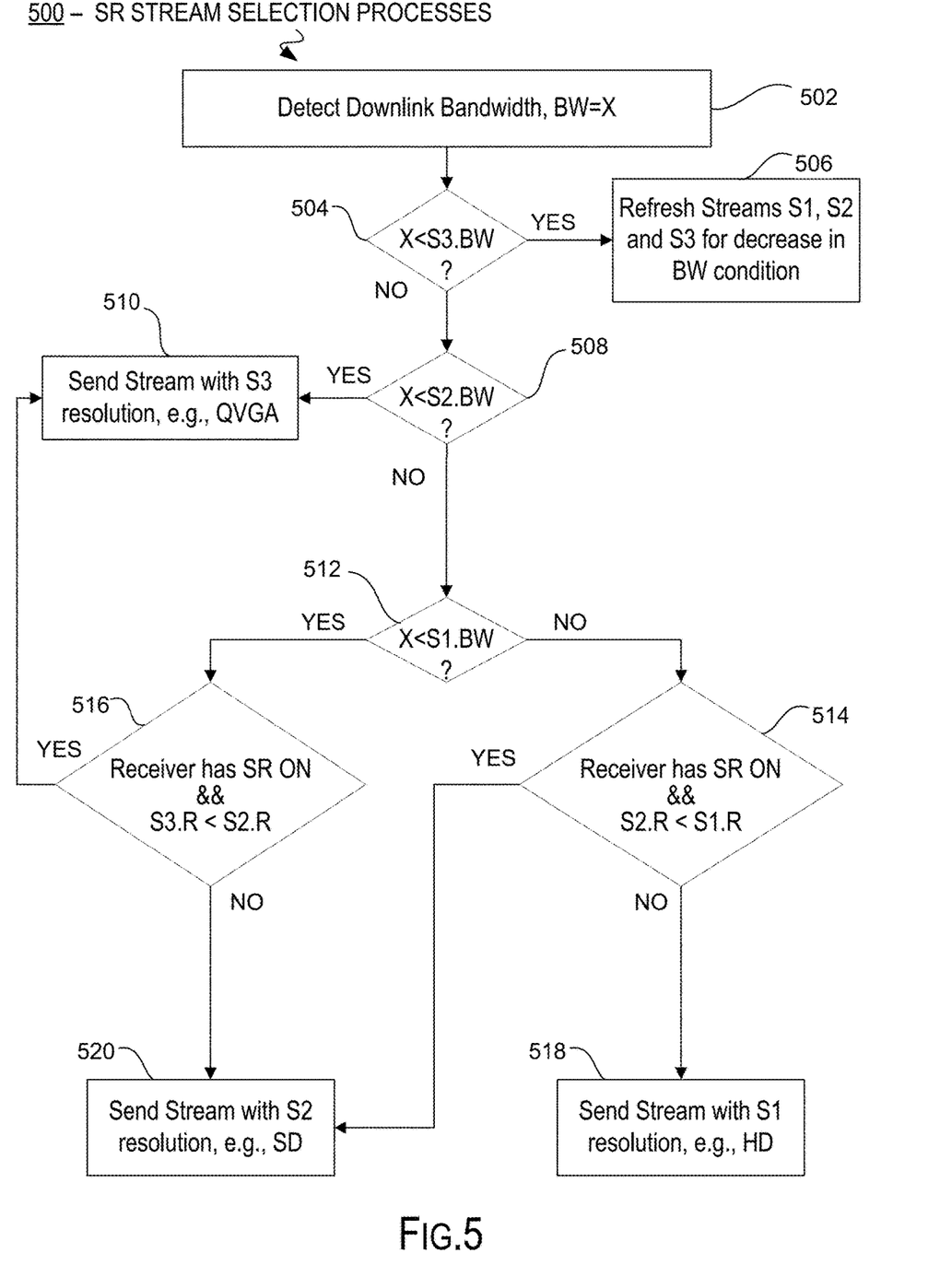
FIG. 5 is a flow diagram illustrating embodiments of processes performed to implement media streaming for receiver-enabled resolution in accordance with various examples described herein.

With reference to FIG. 5, a description of the processes for selecting which type of stream to send from the media server/sender 100 to a receiver 202 is set forth in a flow diagram. The methods, processes and logic depicted in FIG. 5 can comprise hardware (e.g. circuitry, dedicated logic, controllers, etc.), software (such as is run on a general-purpose computer system or a dedicated machine, e.g. a software module or logic), and interfaces (such as a memory interface) between hardware and software, or a combination of both. Although the processes and logic are described below in terms of some sequential operations, it should be appreciated that some of the operations described can be performed in a different order. Moreover, some operations can be performed in parallel rather than sequentially.

At process 502, the SR stream selection process 500 performed by the media server/sender 100 using stream selection logic 212, begins with detecting the downlink bandwidth BW 214, the currently available bandwidth on communication channel 112 represented as the value X. At decision block 504, the process 500 determines whether the available bandwidth X is less than the bandwidth required for the lowest resolution version of the media stream, S3.BW. If so, then none of the versions of the streams, S1, S2 and S3 can be transmitted, and the process 500 at 506 refreshes the streams S1, S2 and S3 to accommodate the decrease in available bandwidth. If not, the process 500 next determines at decision block 508 whether the available bandwidth X is less than the bandwidth required to transmit the medium resolution version of the media stream S2.BW.

If the available bandwidth X is less than the bandwidth required to transmit the medium resolution version of the media stream S2.BW, then the process 500 at 510 transmits the stream with the S3 resolution, the only stream for which the bandwidth is sufficient, e.g. the lowest resolution QVGA. If, however, the available bandwidth X is sufficient to transmit the medium resolution version of the media stream S2.BW, then the process 500 continues at decision block 512 to determine whether the available bandwidth X might also be sufficient to transmit the highest resolution version of the media stream S1.BW. If so, then bandwidth X is sufficient to transmit either S1 or S2, and the process 500 must further determine whether SR is enabled for the receiver before selecting which version to transmit to the receiver.

For example, the process 500 continues at decision block 514 to determine whether the receiver has SR enabled and confirms that the S2 stream resolution is less than the S1 stream resolution. If either condition is false, then the process 500 sends the highest resolution stream S1, e.g., the HD resolution version of the media stream, because either the SR capability is disabled or the S2 stream resolution is the same as the S1 stream resolution and there is no need for the receiver to use its SR capability. But if both conditions are true, then the process 500 concludes at 520 to send to the receiver the stream with the medium resolution, e.g., the S2 media stream with SD resolution, after which the process 500 terminates.

Returning decision block 512, if the available bandwidth X is less than the bandwidth required for transmitting the highest resolution version of the media stream S1.BW, then at decision block 516, the process 500 continues to determine whether the receiver has SR ON and confirms whether the resolution of the lowest resolution media stream S3 is still less than the resolution of the medium resolution media stream S2. If not, then process 500 concludes at 520 to send to the receiver the stream with the medium resolution, i.e. the S2 media stream with the SD resolution, because the receiver is either not SR capable and the S2 media stream is the highest resolution media stream that can be transmitted given the available bandwidth, or because the receiver is SR capable and the S2 media stream in this situation is the lowest resolution media stream. But if the receiver has SR ON and the resolution of the lowest resolution media stream S3 is confirmed to still be less than the resolution of the medium resolution media stream S2, then process 500 concludes at process 510 to send to the SR capable receiver the stream with the lowest resolution, i.e., the S3 media stream with the QVGA resolution, since the SR capable receiver can enhance the QVGA resolution as needed.

Figure 6:
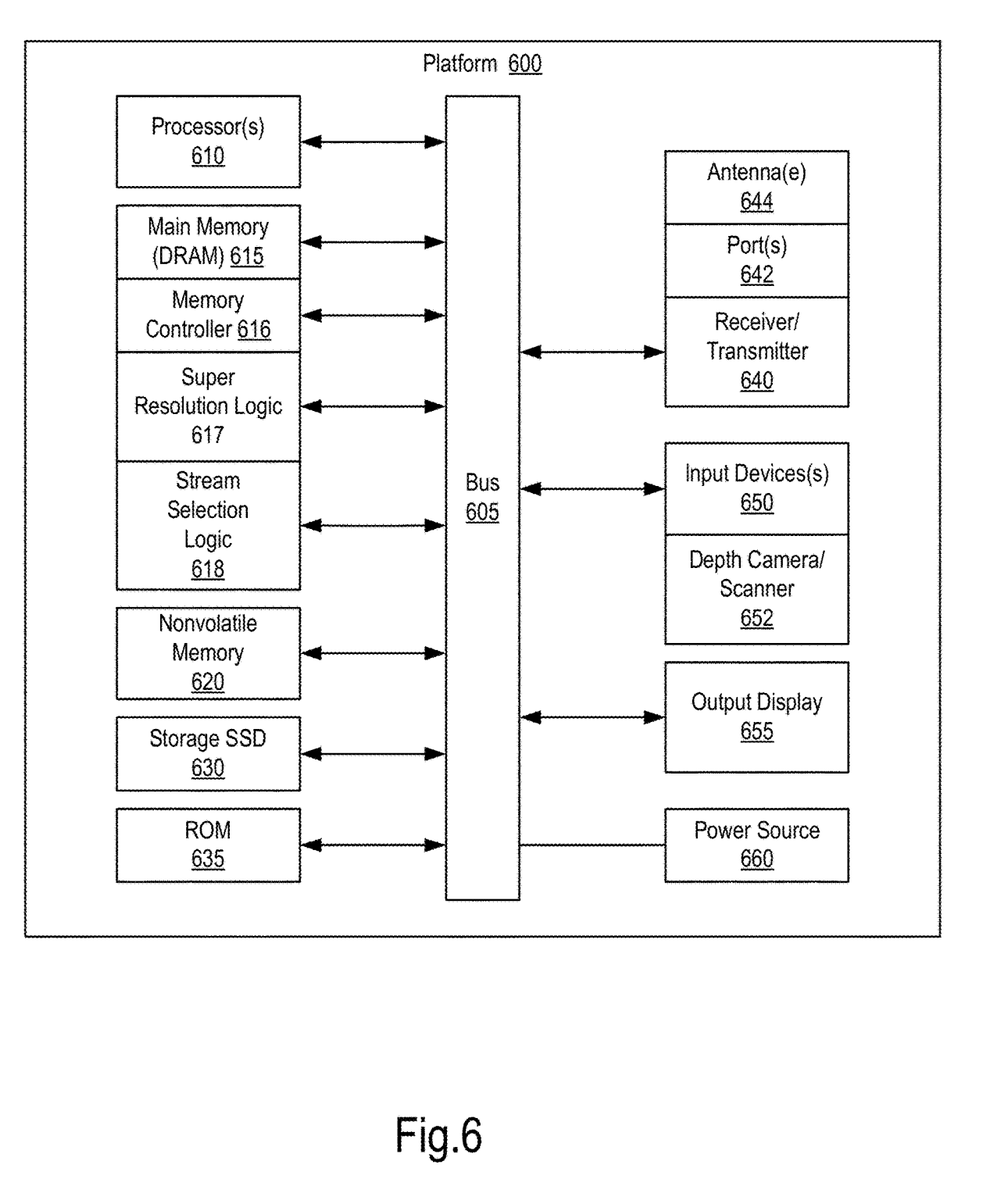
FIG. 6 is a schematic, block diagram illustration of a typical computer system in which embodiments of media streaming for receiver-enabled resolution could be implemented, either in whole or in part, in accordance with various examples described herein.

FIG. 6 is an illustration of a system in which media streaming for receiver-enabled resolution can be implemented according to an embodiment. In this illustration, certain standard and well-known components that are not germane to the present description are not shown. Elements shown as separate elements may be combined, including, for example, a SoC (System on Chip) combining multiple elements on a single chip.

In some embodiments, a computing system such as platform 600 may include a processing means such as one or more processors 610 coupled to one or more buses or interconnects, shown in general as bus 605. The processors 610 may comprise one or more physical processors and one or more logical processors. In some embodiments, the processors may include one or more general-purpose processors or special-purpose processors.

The bus 605 is a communication means for transmission of data. By way of example only and not limitation, the bus 605 is illustrated as a single bus, but can represent multiple different interconnects or buses and the component connections to such interconnects or buses may vary. The bus 605 shown in FIG. 6 is an abstraction that represents any one or more separate physical buses, point-to-point connections, or both connected by appropriate bridges, adapters, or controllers.

In some embodiments, the computing system 600 further comprises a random access memory (RAM) or other dynamic storage device or element as a main memory 615 and memory controller 616 for storing information and instructions to be executed by the processors 610. Main memory 615 may include, but is not limited to, dynamic random access memory (DRAM). In some embodiments, the RAM or other dynamic storage device or element includes a super resolution logic 617 and stream selection logic 618 to implement media streaming for receiver-enabled resolution in accordance with the described embodiments.

The computing system 600 also may comprise a non-volatile memory 620; a storage device such as a solid-state drive (SSD) 630; and a read only memory (ROM) 635 or other static storage device for storing static information and instructions for the processors 610.

In some embodiments, the computing system 600 includes one or more transmitters or receivers 640 coupled to the bus 605. In some embodiments, the computing system 600 may include one or more antennae 644, such as dipole or monopole antennae, for the transmission and reception of data via wireless communication using a wireless transmitter, receiver, or both, and one or more ports 642 for the transmission and reception of data via wired communications. Wireless communication includes, but is not limited to, Wi-Fi, Bluetooth™, near field communication, and other wireless communication standards.

In some embodiments, computing system 600 includes one or more input devices 650 for the input of data, including hard and soft buttons, a joy stick, a mouse or other pointing device, a keyboard, voice command system, or gesture recognition system. In one embodiment, the computing system 600 includes one or more depth cameras/scanners 652 to capture data used for image processing, including 3D data. The depth cameras/scanners can include RGB-D (red, green, blue, depth) sensors, and Lidar (Light Detection and Ranging) remote scanners.

In some embodiments, computing system 600 includes an output display 655, where the output display 655 may include a liquid crystal display (LCD) or any other display technology, for displaying information or content to a user. In some environments, the output display 655 may include a touch-screen that is also utilized as at least a part of an input device 650. Output display 655 may further include audio output, including one or more speakers, audio output jacks, or other audio, and other output to the user.

The computing system 600 may also comprise a battery or other power source 660, which may include a solar cell, a fuel cell, a charged capacitor, near field inductive coupling, or other system or device for providing or generating power in the computing system 600. The power provided by the power source 660 may be distributed as required to elements of the computing system 600.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 615 or the non-volatile memory 620 or a combination of such memories, and each of these memories is a form of a machine readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

Thus, the techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or other form of processing core that executes program code instructions. Thus, processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application. Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Additional example implementations are as follows:

Example 1 is a method, system, apparatus or computer-readable medium for streaming media including receiving a request from a receiver to receive a media stream via a communication channel, the request indicating that the receiver has a receiver-enabled capability to receive the media stream at lower resolutions, sending an acknowledgement accepting the receiver request, selecting a lower resolution from multiple resolutions of the media stream available from the media server, and transmitting the media stream with the lower resolution based on the receiver request, wherein the lower resolution of the media stream is compatible with the receiver-enabled capability to receive the media stream at lower resolutions.

Example 2 is the method, system, apparatus or computer-readable medium of Example 1 further including receiving a notification from the receiver that the receiver-enabled capability to receive the media stream at lower resolutions is any one of enabled and disabled, selecting any of the lower and higher resolution from the multiple resolutions of the media stream available from the media server, and transmitting the media stream with a selected resolution based on the receiver notification, wherein the selected resolution is any one of the lower resolution while the receiver-enabled capability to receive the media stream at lower resolutions is enabled and the higher resolution while the receiver-enabled capability to receive the media stream at lower resolutions is disabled.

Example 3 is any of the method, system, apparatus or computer-readable medium of Examples 1 and 2, where the notification from the receiver is compliant with a real-time communication protocol (RTCP).

Example 4 is any of the method, system, apparatus or computer-readable medium of Examples 1, 2 and 3, further including receiving a bandwidth availability of the communication channel, where selecting any of the lower and higher resolutions from the multiple resolutions of the media stream available from the media server is based at least in part on the bandwidth availability of the communication channel.

Example 5 is any of the method, system, apparatus or computer-readable medium of Examples 1, 2, 3, and 4, where transmitting the media stream with the selected resolution includes transporting the media stream to multiple receivers at different resolutions selected from the multiple resolutions, wherein any one or more of the multiple receivers have any of enabled and disabled the receiver-enabled capability to receive the media stream at lower resolutions.

Example 6 is any of the method, system, apparatus or computer-readable medium of Examples 1, 2, 3, 4 and 5, where the receiver-enabled capability to receive the media stream at lower resolutions includes a super resolution capability for processing any of temporal and spatial information to enhance the media stream at lower resolutions.

Example 7 is any of the method, system, apparatus or computer-readable medium of Examples 1, 2, 3, 4, 5 and 6, where the request from the receiver to receive the media stream via the communication channel is compliant with a session definition protocol (SDP).

Example 8 is any of the method, system, apparatus or computer-readable medium of Examples 1, 2, 3, 4, 5, 6 and 7, where the multiple resolutions of the media stream available from the media server include any of high-definition, standard definition and quarter video graphics array media resolutions.

Numerous specific details have been set forth to provide a thorough explanation of embodiments of the methods, media and systems for providing media streaming for receiver-enabled resolution. It will be apparent, however, to one skilled in the art, that an embodiment can be practiced without one or more of these specific details. In other instances, well-known components, structures, and techniques have not been shown in detail so as to not obscure the understanding of this description.

Reference in the specification to "one embodiment" or "an embodiment" means that a particular feature, structure, or characteristic described in connection with the embodiment can be included in at least one embodiment. The appearances of the phrase "in one embodiment" in various places in the specification do not necessarily all refer to the same embodiment.

In the foregoing specification, embodiments have been described with reference to specific exemplary embodiments or implementations. It will be evident that various modifications could be made to the described embodiments or implementations without departing from the broader spirit and scope of the embodiments or implementations as set forth in the following claims. The specification and drawings are, accordingly, to be regarded in an illustrative sense rather than a restrictive sense.

What is claimed is:

1. A computer-implemented method for streaming media comprising:
  receiving, in a media server, a request from a first receiver to receive a media stream, the request indicating that the first receiver has enabled a receiver-enabled super resolution machine-learning capability to process any of a temporal information and a spatial information to up-sample video frames in the media stream in real-time to enhance the media stream received at lower resolutions;
  sending, from the media server to the first receiver, an acknowledgement accepting the request;
  selecting, in the media server, one or more resolutions of the media stream available from the media server;
  simulcasting, from the media server, the media stream via a communication channel to one or more receivers at the one or more resolutions, including at a lower resolution to the first receiver and at a higher resolution to a second receiver for which the receiver-enabled super resolution machine-learning capability is any of not known or disabled; and
  wherein the lower resolution of the media stream is compatible with the receiver-enabled super resolution machine-learning capability of the first receiver, and reduces consumption of a bandwidth of the communication channel.

2. The computer-implemented method of claim 1, further comprising:
receiving, in the media server, a notification from the first receiver that the receiver-enabled super resolution machine-learning capability is any one of enabled and disabled; and
simulcasting, from the media server, the media stream at the one or more resolutions based on the notification from the first receiver, wherein the is one or more resolutions include the lower resolution while the receiver-enabled super resolution machine-learning capability of the first receiver is enabled and the higher resolution while the receiver-enabled super resolution machine-learning capability of the first receiver is disabled.

3. The computer-implemented method of claim 2, wherein the notification received in the media server from the first receiver is compliant with a real-time communication protocol (RTCP).

4. The computer-implemented method of claim 1, further comprising:
receiving, in the media server, a bandwidth availability of the communication channel; and
wherein selecting, in the media server, the one or more resolutions of the media stream available from the media server is based at least in part on the bandwidth availability of the communication channel.

5. The computer-implemented method of claim 1, wherein the request received in the media server from the first receiver is compliant with a session definition protocol (SDP).

6. The computer-implemented method of claim 1, wherein the one or more resolutions of the media stream available from the media server include any of high-definition, standard definition and quarter video graphics array media resolutions.

7. A computer-implemented system to stream media comprising:
at least one media server having logic to simulcast a media stream at one or more resolutions to one or more receivers, including to at least one receiver having a receiver-enabled super resolution machine-learning capability to process any of a temporal information and a spatial information to up-sample video frames in the media stream in real-time to enhance the media stream received at a lower resolution;
at least one communication channel to simulcast the media stream at the one or more resolutions to the one or more receivers; and
at least one processor communicatively coupled to the at least one media server and the at least one communication channel, the at least one processor to perform the logic to simulcast the media stream at the one or more resolutions to one or more receivers based on the receiver-enabled super resolution machine-learning capability, including to:
receive an offer from a first receiver to receive the media stream at the lower resolution, the offer indicating that the first receiver has enabled the receiver-enabled super resolution machine-learning capability,
send an acknowledgement of the offer to the first receiver,
select the one or more resolutions of the media stream available from the media server, including at least one of the lower resolution and a higher resolution, the lower resolution of the media stream compatible with the receiver-enabled super resolution machine-learning capability,
simulcast the media stream at the one or more resolutions via the at least one communication channel to the one or more receivers, including at the lower resolution to the first receiver and at the higher resolution to a second receiver for which the receiver-enabled super resolution machine-learning capability is any of not known or disabled, and
wherein the processor to reduce consumption of a bandwidth of the at least one communication channel.

8. The computer-implemented system of claim 7, wherein the offer is compliant with a session definition protocol (SDP).

9. The computer-implemented system of claim 7, wherein to perform the logic to simulcast the media stream at the one or more resolutions to the one or more receivers based on the receiver-enabled super resolution machine-learning capability, the at least one processor is further to:
receive a notification from the first receiver that the receiver-enabled super resolution machine-learning capability previously on offer is any of enabled and disabled;
send an acknowledgement of the notification to the first receiver;
select the one or more resolutions of the media stream available from the media server based on the notification; and
simulcast the media stream at the one or more resolutions via the at least one communication channel to the one or more receivers, including at any one of the lower resolution and the higher resolution to the first receiver based on the notification.

10. The computer-implemented system of claim 9, wherein the notification is compliant with a real-time communication protocol (RTCP).

11. The computer-implemented system of claim 7, wherein to perform the logic to simulcast the media stream at the one or more resolutions to the one or more receivers based on the receiver-enabled super resolution machine-learning capability, the at least one processor is further to:
receive a bandwidth availability of the communication channel; and
select the one or more resolutions of the media stream available from the media server based at least in part on the bandwidth availability of the communication channel and the receiver-enabled super resolution machine-learning capability of the one or more receivers.

12. The computer-implemented system of claim 7, wherein the one or more resolutions of the media stream available from the media server include any of high-definition, standard definition and quarter video graphics array media resolutions.

13. At least one machine readable medium comprising a plurality of instructions executable by a system to cause the system to:
receive, in a media server hosted in the system, a request from a first receiver to receive a media stream, the request indicating that the first receiver has enabled a receiver-enabled super resolution machine-learning capability to process any of a temporal information and a spatial information to up-sample video frames in the media stream in real-time to enhance the media stream received at lower resolutions;

send, from the media server to the first receiver, an acknowledgement accepting the request;

select, in the media server, one or more resolutions of the media stream available from the media server;

simulcast, from the media server, the media stream via a communication channel to one or more receivers at the one or more resolutions, including at a lower resolution to the first receiver and at a higher resolution to a second receiver for which the receiver-enabled super resolution machine-learning capability is any of not known or disabled; and wherein the lower resolution of the media stream is compatible with the receiver-enabled super resolution machine-learning capability of the first receiver and reduces consumption of a bandwidth of the communication channel.

14. The at least one machine readable medium of claim 13, the plurality of instructions to further cause the system to:

receive, in the media server, a notification from the first receiver that the receiver-enabled super resolution machine-learning capability is any one of enabled and disabled; and simulcast, from the media server, the media stream at the one or more resolutions based on the notification from the first receiver, wherein the one or more resolutions include the lower resolution while the receiver-enabled super resolution machine-learning capability of the first receiver is enabled and the higher resolution while the receiver-enabled super resolution machine-learning capability of the first receiver is disabled.

15. The at least one machine readable medium of claim 13, wherein:

the one or more resolutions of the media stream available from the media server include any of high-definition, standard definition and quarter video graphics array media resolutions; and the plurality of instructions further cause the system to:

receive, in the media server, a bandwidth availability of the communication channel, and select, in the media server, the one or more resolutions of the media stream available from the media server based at least in part on the bandwidth availability of the communication channel.

* * * * *